United States Patent
Carbone et al.

(10) Patent No.: US 12,504,354 B2
(45) Date of Patent: Dec. 23, 2025

(54) METHOD FOR IMMOBILISING BIOLOGICAL SAMPLES FOR ANALYTICAL AND DIAGNOSTIC PURPOSES

(71) Applicant: TETHIS S.P.A., Milan (IT)

(72) Inventors: Roberta Carbone, Opera (IT); Gian Martino Franchi, Cislago (IT); Marzia Luigia De Marni, Milan (IT)

(73) Assignee: TETHIS S.P.A., Milan (IT)

( * ) Notice: Subject to any disclaimer, the term of this patent is extended or adjusted under 35 U.S.C. 154(b) by 1114 days.

(21) Appl. No.: 16/631,253

(22) PCT Filed: Jul. 23, 2018

(86) PCT No.: PCT/IB2018/055456
§ 371 (c)(1),
(2) Date: Jan. 15, 2020

(87) PCT Pub. No.: WO2019/021150
PCT Pub. Date: Jan. 31, 2019

(65) Prior Publication Data
US 2020/0209120 A1    Jul. 2, 2020

(30) Foreign Application Priority Data
Jul. 26, 2017 (IT) .......... 102017000085439

(51) Int. Cl.
*G01N 1/31* (2006.01)
*G01N 1/28* (2006.01)
*G01N 33/543* (2006.01)
*G01N 33/574* (2006.01)

(52) U.S. Cl.
CPC .......... *G01N 1/312* (2013.01); *G01N 1/2813* (2013.01); *G01N 33/543* (2013.01); *G01N 33/54346* (2013.01); *G01N 33/57492* (2013.01)

(58) Field of Classification Search
CPC ............. G01N 1/312; G01N 2001/302; G01N 1/2813; G01N 2001/305; G02B 21/34
See application file for complete search history.

(56) References Cited

U.S. PATENT DOCUMENTS

2015/0285808 A1    10/2015 Nagrath et al.

FOREIGN PATENT DOCUMENTS

| CN | 103667191 A | 3/2014 | |
|---|---|---|---|
| CN | 105950436 A | 9/2016 | |
| EP | 2966445 A1 | 1/2016 | |
| JP | 2012-515908 A | 7/2012 | |
| WO | 2010/084196 A1 | 7/2010 | |
| WO | 2012016136 A2 | 2/2012 | |
| WO | 2013049636 A | 4/2013 | |
| WO | WO-2013049636 A1 * | 4/2013 | ............ B01L 3/5027 |
| WO | 2014/136885 A1 | 3/2014 | |

OTHER PUBLICATIONS

Bardhan et al. 2017 (Enhanced Cell Capture on Functionalized Graphene Oxide Nanosheets through Oxygen Clustering; AXS Nano 11: 1548-1558). (Year: 2017).*
Liu et al. 2013 (Application of ZnO/graphene and S6 aptamers for sensitive based on a disposable indium tin oxide device; Biosensors and Bioelectronics 51: 413-420). (Year: 2013).*
Neelkanth M. Bardhan et al: "Enhanced Cell Capture on Functionalized Graphene Oxide Nanosheets through Oxygen Clustering", ACS Nano, vol. 11, No. 2, Jan. 13, 2017, pp. 1548-1558, XP055503685.
Hyeun Joong Yoon et al: "Tunable Thermal-Sensitive Polymer-Graphene Oxide Composite for Efficient Capture and Release of Viable Circulating Tumor Cells", Advanced Materials, vol. 28, No. 24, Apr. 26, 2016, pp. 4891-4897, XP055503644.
H. K. Lin et al: "Portable Filter-Based Microdevice for Detection and Characterization of Circulating Tumor Cells", Clinical Cancer Research, vol. 16, No. 20, Sep. 28, 2010 (Sep. 28, 2010), pp. 5011-5018, XP055066355, ISSN: 1078-0432, DOI: 10.1158/1078-0432.CCR-10-1105.
Jeong J.-T. et al. Effect of graphene oxide ratio on the cell adhesion and growth behavior on a graphene oxide-coated silicon substrate // Scientific Reports, 2016, V.6, pp. 1-10, [found online on Jul. 22, 2021], found on the Internet: https://www.nature.com/articles/srep33835.pdf.
European Office Action mailed Feb. 7, 2022, in related EP Application No. 18753248.
Russian Office Action mailed Feb. 7, 2022, in related RU Application No. 2020102076.

* cited by examiner

Primary Examiner — Mary Maille Lyons
(74) Attorney, Agent, or Firm — Volpe Koenig

(57) ABSTRACT

A method for immobilising live cells within biological samples for analytical and diagnostic purposes that comprises the steps of providing a biological sample containing a predetermined number of cells to analyse; providing a planar support particularly suitable for use in an analytical device, the planar support comprising a surface functionalised with a surface coating comprising a nanostructured material; depositing a laminar layer of said biological sample on said functionalised surface of said planar support in order to cause the cells contained in the biological sample to adhere to the functionalised surface of the planar support; and positioning a fixative on the laminar layer of the biological sample. All of the above-mentioned steps are carried out at a temperature below at least 25° C.

10 Claims, No Drawings

METHOD FOR IMMOBILISING BIOLOGICAL SAMPLES FOR ANALYTICAL AND DIAGNOSTIC PURPOSES

TECHNICAL FIELD

The present invention relates to the field of instrumental analysis of biological fluids and it has been developed with particular regard to a method for immobilising biological samples for analytical and diagnostic purposes on liquid biopsy samples.

PRIOR ART

A liquid biopsy consists of a biological fluid sample extracted from various body parts, for example, peripheral blood, bone marrow, cerebrospinal fluid, urine, saliva, sputum, tears, and seminal fluid, that contains cells of potential diagnostic value for specific diseases or physiological conditions of medical interest.

Analysis of the cells present in a liquid biopsy sample via immunological and molecular characterisation, is becoming an increasingly important method in diagnostics for screening, preventing, identifying and following up pathological conditions, not only for making the initial diagnosis but also through to the assessment of the therapy's efficacy.

For example, rare tumour cells known as Circulating Tumour Cells (CTC) deriving from solid tumours have been identified in various biological fluids. The scientific research has dedicated considerable effort on developing isolation and analysis methods that could prove efficient and valid, or rather, sensitive and specific, from a clinical point of view.

Similarly to tumour cells, Circulating Foetal Cells (CFC) were identified in pregnant women. CFCs are rare cells that can be isolated from maternal blood with a simple blood sample, and, therefore, a non-invasive method. Such a "liquid biopsy" sample can be used for Non-Invasive Prenatal Diagnosis (NIPD) of chromosomal aneuploidies or other foetal genetic abnormalities.

The paradigm that enumeration of CTCs provides clinical and diagnostic data on the evolution of a specific tumour has emerged from various clinical studies. More recently, accurate proteomic and molecular characterisation was proven to be essential in linking these rare cells to the original tumour and accurately predicting the outcome of the disease.

There are many different known approaches with the final objective to isolate CTCs or other rare cells, characterise them by immunological or molecular means, and assess their clinical significance in biological fluids. However, by definition, these are rare cells that circulate in the blood or other fluids together with millions of other circulating cells that belong, for example, in the haematopoietic compartment, and do not adhere spontaneously. As a result, isolating and immobilising rare cells in a rapid and stable fashion on a support for subsequent testing is not an easy or quick task.

At a clinical level, cellular morphology is another relevant factor in cell analysis from a liquid biopsy. All living cells respond to external stimuli, for example, to adhesion to the proteic surfaces or coatings of antibodies matrices, to drug treatments, to stressing environmental conditions due to fluxes or pressures. This biological response to the external stimuli is able to cause a substantial alteration in cell morphology which, in turn, leads to an inaccurate diagnosis.

For example, CN103667191 e CN105950436 disclose methods utilising a fractal or nano-structured surface, comprising a step wherein the surface is prepared through the adhesion of specific antibodies, for example anti-EpCAM, and/or modified antibodies, before depositing the biological fluid sample on said surface.

Conversely, in order to obtain a cell with an "unaltered" biological characteristic that corresponds to its "in vivo" condition for clinical assessment purposes, any manipulation, interaction with external stimuli and/or prolonged treatment of the biological sample, that are known to induce such alterations, should be minimised.

Cytocentrifugation of live cells is another known method of analysis that meets these specifications. Through the centrifugal force applied to the sample, this method causes the cells to press against a support, for example, a microscope slide, and enables their fixation and subsequent staining with immunological (immunofluorescence) or molecular (FISH) methods.

This method, however, causes partial, or total, rupture of the cell and alters its morphology radically, making diagnostic assessment of the result difficult.

Another known method provides a biological fluid flowing through a series of obstacles so as to trap cells having a predetermined size greater that the size of the channels created between the obstacles. For example, in WO2013049636 is disclosed a substrate, an extension coupled to the substrate and extending outwardly from the substrate, and a functionalized graphene oxide disposed on the extension. The extensions defines a plurality of radial channels and chambers though which the biological fluid flows. Moreover, in case of liquid biopsy for the identification of CTCs, one or more markers, antibodies, antigens, proteins or specific tumor-binding agents, e.g. anti-EpCAM, are applied to the graphene oxide before depositing the biological fluid sample on said surface.

Similarly, in WO2012016136, it is known to provide micro and nanostructures comprising a porous series of obstacles through which a biological fluid can flow. These obstacles are able to mechanically block the cells having dimensions greater than the size of the channel created between the obstacles. Also in this case, to the obstacles are applied substances that can chemically manipulate the cells that cross them.

One of the main drawback of the solutions selecting, capturing, CTCs through obstacles inserted in a path through which a biological sample flows is given by the biological and therefore morphological alteration of the cells themselves subjected to flow stress. Furthermore, these methods, by their nature, select a homogeneous population of cells by size or expression of superficial membrane proteins, not respecting the heterogeneity characteristic that characterizes all biological samples. This biological heterogeneity is a data of clinical importance that these methods cannot provide.

Since numerous parameters, including the biological representativeness of the sample, can affect diagnostic accuracy, a need exist of a method that can provide highly accurate cell morphology throughout the analysis of a liquid biopsy sample and maintain, within the sample, a high number of cells with predetermined biological characteristics of clinical value. In the particular case of CTCs, the possibility of analysing the living fraction of the circulating cells, which may have different characteristics of size and morphology and protein expression, would undoubtedly represent the most appropriate analytical tool for an early diagnosis of possible metastatic processes. It is well known that the metastatic process derives from one or more CTCs that are able to survive in the blood compartment and invade tissues of target organs to begin the process of metastatic tumour growth.

In light of the above, it is the purpose of this invention to provide a solution to this need. Another purpose is to obtain the result with a simple, rational solution at a reasonable cost.

These purposes are achieved by the characteristics of the invention set forth in the independent claim. The dependent claims outline preferred and/or particularly advantageous aspects of the invention.

DISCLOSURE OF INVENTION

An embodiment of this invention provides a method for immobilising live cells within biological samples for analytical and diagnostic purposes comprising the steps of:
providing a biological sample containing a predetermined number of cells to analyse;
providing a planar support particularly suitable for use in an analytical device;
said planar support comprising a surface functionalised with a surface coating comprising a nanostructured material;
depositing a laminar layer of said biological sample on said functionalised surface of said planar support in order to cause the cells contained in the biological sample to adhere to the functionalised surface of the planar support; and
positioning a fixative on the laminar layer of the biological sample;
said steps being carried out at a temperature lower than 25° C.; characterised in that it further comprises a step of adhering the cell contained in the biological sample to the functionalised surface of the planar support, said step being carried out at a temperature lower than 25° C.

This solution preserves as much as possible the characteristics that reflect the original condition of the sample because every step in the method is performed at a temperature that substantially corresponds to the ambient temperature. Therefore, there is no need to subject the cells in the biological sample to temperature variations or flow stresses that could alter cell morphology.

Another aspect of this invention provides that there is a time range of less than 4 minutes between the step of positioning the laminar layer of biological sample on the planar support and the step of positioning the fixative on said laminar layer.

Thanks to this solution, it is possible to ensure that the cells contained in the biological sample do not undergo morphological changes that alter their original "in vivo" state, reducing normal processing time by as much as 100-fold compared to known live cell immobilisation methods.

A further aspect of this invention provides that the ratio between the total surface of the planar support and the surface of the planar support occupied by the laminar layer of biological sample is between 1.5 and 9.

As a result of this solution, the surface area of the microscope slide available for cell adhesion can be up to 20 mm×60 mm, and thus, maximum advantage is taken of the available surface and fewer standard slides are needed to analyse large volumes of biological samples.

Another aspect of this invention provides that the percentage of live cells contained in the biological sample that remain attached to the surface coating of the planar support is higher than 90%.

Another aspect of this invention provides that the percentage of live cells contained in the biological sample that remain attached to the surface coating of the planar support is equal to 99%.

Said solution is thus able to ensure the faithful representativeness of the patient's sample, especially in the case of analysis on rare cells in a rare cell population.

A further aspect of this invention provides that the volume of the laminar layer of said biological sample is between 1 microlitre and 2 millilitres.

Thanks to this solution, it is possible to analyse a large spectrum of biological sample volume, obtaining, for all, the same adhesion efficiency percentage and, as a result, the same number of identifiable cells.

Another aspect of this invention includes a step of associating a confining hydrophobic substance to the planar support.

In yet another aspect of this invention, the nanostructured material of the film is selected from among any one of the following: Zinc Oxide (ZnO), Zirconium Dioxide ($ZrO_2$), Titanium Dioxide ($TiO_2$).

Said solution ensures that functionalisation materials do not interfere with normal cell activities and do not react with the reagents used to prepare the cell cultures. Moreover, the Titanium Dioxide improves fluorescence-based measurements due to its weak autofluorescence.

Another aspect of this invention provides that the live cells that remain attached to the surface coating of the planar support are rare cells.

As a result of this solution, it is possible to link the rare cells identified in the biological sample to the original tumour and accurately predict the outcome of the disease and/or the medical treatment that is being given.

A further embodiment of this invention provides a method of diagnosis or prognosis of a tumour in a patient, comprising the steps of performing the method previously reported, analysing the biological sample to identify the CTCs, enumerating the CTCs through image analysis to obtain first clinical data on the patient.

BEST MODE FOR CARRYING OUT THE INVENTION

Some embodiments can include the provision of a biological sample containing a predetermined number of live cells to analyse. Throughout this description, "biological samples" shall be construed as cytological samples of live cells present in various biological fluids, for example, derived from liquid biopsy, and deproteinised in a solution. The biological samples are collected from humans and preserved in suitable containers and under predetermined environmental conditions until the time of their analysis.

Before analysis, the biological samples and, therefore, the live cells in them, can be subjected to a preliminary treatment via standard protocols, for example, via red blood cell lysis procedure if the biological sample is blood. Subsequently, the cells can be dispersed in an isotonic saline liquid, for example, a phosphate buffer.

In other cases, such as, by way of example but without limitation, in the presence of cerebrospinal fluid, the biological sample is not subjected to any preliminary treatment.

Some embodiments can include the preparation of a biological sample presumably containing rare cells, for example, rare tumour cells, i.e. Circulating Tumour Cells (CTCs), derived from solid tumours. Likewise, other embodiments can include the preparation of a biological sample presumably containing Circulating Foetal Cells (CFCs).

Some embodiments can also include counting of the cells present in the biological sample. For example, in the case of a blood sample, which normally does not contain rare cells, the cells are counted in order to determine in the subsequent steps the number of cells that will be analysed.

Once the biological sample is ready, it is dispensed onto a planar support, for example, a microscope slide, that is particularly suitable for use in an analytical instrument. After a predetermined time range, the cells contained in the biological sample and deposited onto the planar support are fixed using an alcoholic or cross-linking fixative, analysed, for example but not limitatively, via cellular colorants, antibodies or DNA/RNA probes and visualised with visible or fluorescent staining.

Specific markers can be used for the analysing operations to identify target cells of diagnostic interest, such as, for example, rare or non-rare cells present in the biological fluids.

Next, the biological sample dispensed onto the planar support can be analysed under an automated fluorescence or clear field microscope to identify the target cells based on the markers of specific interest. For example, in the case of Circulating Tumour Cells (CTCs) in the blood, the pan keratin and CD45 markers are used to reveal cells of epithelial or haematopoietic origin. Through image analysis, rare cells identified as CTCs (pan keratin-positive and CD45-negative) are enumerated to obtain first clinical data regarding CTC enumeration in the patient.

Once the target cells have been identified, they can be localised on the planar support, isolated via micromanipulation or "laser microdissection", and tested by molecular assays up to single-cell genome or transcriptome sequencing. Molecular and biological characterisation of target cells that are specific for particular disease states represents the analytical data for disease diagnosis in the context of personalised medicine.

According to one of the preferred embodiments of the present invention, the method for immobilising live cells within biological samples for analytical and diagnostic purposes comprises a first step of providing a planar support particularly suitable to receive a biological sample.

The planar support is flat support, elongated in a preferential direction, and with a very small thickness, for example and not as a limitation, with a thickness of approximately 1 mm. The planar support does not comprise any form of physical containment boundary with walls and ceiling.

The planar support is preferably made from a transparent material, such as, for example, quartz, some types of plastic, or, preferably glass. The size of the planar support can vary within wide limits, though, preferably, it is similar to the support used for automated analysis in the medical and biological fields, so that the planar support of the present invention will be particularly suitable for use in an analytical device and able to be handled with the automated means already being used in the field. For example, the planar support can have lateral dimensions of 25×76 mm and thickness of 1 mm.

The planar support comprises at least a flat nano-structured surface, i.e. functionalised, that is a flat surface to which a surface coating, for example, a film, comprising a nanostructured material is applied. According to one of the possible embodiments of the present invention, the surface coating can comprise, for example but not as a limitation, Zinc Oxide (ZnO), Zirconium Dioxide ($ZrO_2$), preferably Titanium Dioxide ($TiO_2$), in the form of a film. The film of nanostructured material, as well as the flat nano-structured surface, comprises nanoparticles with a size distribution below 50 nm, and it has a thickness between 20 nm and 200 nm, preferably between 40 nm and 60 nm, with surface roughness between 2 nm and 30 nm, preferably between 5 nm and 15 nm.

Different techniques can be used to deposit the film of nanostructured material onto the flat surface of the planar support, including and not limited to, sputtering, pulsed laser deposition (PLD), or, preferably, deposition of nanoparticles in supersonic beam using pulsed microplasma cluster source (PMCS).

The film of nanostructured material, as well as the flat nano-structured surface, is preferably treated with oxygen plasma to increase its hydrophilicity.

The flat nano-structured surface defines a delimited area having a predetermined size. The flat nano-structured surface may define an area corresponding to the area of the entire planar support, or it may define an area having a smaller size than the area of the entire planar support.

The method for immobilising live cells within biological samples for analytical and diagnostic purposes comprises a second and subsequent step of depositing, in which a predetermined amount of biological sample is deposited directly on the flat nano-structured surface.

According to a feature of this invention, a laminar layer of biological sample can be dispensed, thus deposited, onto the planar support, and thus on the flat nano-structured surface. Throughout this description laminar layer shall be construed as a quantity of substance wherein the lateral sizes of said substance are greater than the thickness of said substance.

The volume of the laminar layer of biological sample dispensed, thus deposited, onto the planar support can vary widely according both on the area of the flat nano-structured surface of the planar support both according to the quantity of biological sample that has to be analysed in order to obtain the desired results.

The method for immobilising live cells within biological samples for analytical and diagnostic purposes includes a third and subsequent step of adhering of, or immobilising, live cells contained in the biological sample to the flat nano-structured surface. During this step, the laminar layer of biological sample is left standing on said flat nano-structured surface for a predetermined time range, allowing the cells contained in the biological sample to touch the surface and adhere, and thus to immobilize, to the flat nano surface.

The method for immobilising live cells within biological samples for analytical and diagnostic purposes includes a fourth and subsequent step of fixing the live cells, in which the live cells contained in the biological sample and adhered, or immobilized, on the nano-structured flat surface in the previous phase are fixed by the application of a fixative substance, for example with an alcoholic or cross-linking fixative.

According to a particularly advantageous feature of this invention, all steps preceding the step of analysing the biological sample via an instrument can be carried out at a temperature lower than 25° C. In particular, the step of dispensing a laminar layer of biological sample onto the planar support so that the cells contained in the biological sample adhere to the surface coating of the planar support, and the step of positioning a fixative on the laminar layer of the biological sample, can be carried out at a temperature lower than 25° C., preferably between 18° C. and 25° C., and even more preferably between 21° C. and 25° C.

Even more preferably, the step of immobilising the cells on the flat nano-structured surface is carried out at a temperature lower than 25° C., preferably between 18° C. and 25° C., even more preferably between 21° C. and 25° C. Moreover, the step of immobilising the cells on the flat nano-structured surface is carried out without positioning the planar support in a cell incubation device, and, in general, without any intermediate incubation step.

According to a further particularly advantageous feature of this invention, the predetermined time range between the step of dispensing the laminar layer of biological sample onto the planar support and the step of positioning the fixative on said laminar layer can be significantly reduced in comparison to the prior art. In particular, said time range can be less than 5 minutes, preferably less than 4 minutes.

Even more preferably the predetermined time range of the step of adhering or immobilising of the method of the present invention, i.e. the predetermined time range in which the laminar layer of biological sample is left stationary on said flat nano-structured surface, is less than 5 minutes, even more preferably less than 4 minutes.

Several experiments conducted by the Applicant have shown how such temperature ranges and such time ranges can be achieved by using a planar support having lateral dimensions equal to 25 mm×76 mm and onto which a laminar layer of biological sample of volume between 1 μl and 2 ml can be dispensed.

The surprising effect that the experiments also revealed is that such temperature ranges and, in particular, time ranges allow live cells contained in the biological sample to adhere, or to be immobilized, to the flat nano-structured surface with a percentage greater than 90%, and in many cases, with a percentage equal to 99%.

In the known methods and systems, a much longer time range is required to allow the cells to fix on the planar support in a sufficient number to be significant in the subsequent analysis steps. In the methods and systems of the known type, the use of time ranges identical to the method of the present invention, although they reduced cellular deterioration, did not allow the adhesion of living cells in a percentage such as to constitute an analytical datum valid for the diagnosis of diseases in the field of personalized medicine, especially in the case of analysis of rare cells in a rare cell population.

Such experiments have also revealed how the ratio between the total surface area of the planar support and the surface area of the planar support occupied by the laminar layer of biological sample can be preferably between 1.5 and 9. The method for immobilising live cells within biological samples for analytical and diagnostic purposes according to the present invention does not include any step in which the flat nano-structured surface of the planar support is prepared by adhesion of specific antibodies, for example anti-Ep-CAM, and/or modified antibodies, prior to a deposition phase of the biological fluid sample on said surface.

The method for immobilising live cells within biological samples for analytical and diagnostic purposes according to the present invention does not include any step in which the biological fluid is made to flow on the flat nano-structured surface. In particular, the method of the present invention does not comprise any step in which the biological fluid is flew through a series of obstacles so as to retain cells having a predetermined size greater than the size of the channel created between the obstacles.

According to another particularly advantageous feature of the present invention, the flat nano-structured surface of the planar support of the present invention does not comprise protein antibody matrices surfaces or coatings.

According to a further particularly advantageous feature of the present invention, the live cells contained in the biological fluid are not subjected during the adhesion or immobilization step to environmental stress conditions due to flows or pressures.

These conditions are all essential to provide a cell sample that is representative for clinical testing, with minimal perturbation to the biological state, and to overcome the limitations described with other known immobilisation and isolation methods.

A further advantage of the results achieved with the method of the present invention consists in the quantity of biological samples, and thus, in the quantity of planar supports, to be analysed in order to obtain an accurate diagnosis. For example, a large number of cells are required to identify rare cells in samples coming from a liquid biopsy, e.g. peripheral blood. Where blood is the biological sample, the number of cells must be approximately 30-40 million white blood cells (leukocytes).

Through the present method, a significant number of cells can be immobilised per planar support, for example, equal to at least 2.0-3.0 million per planar support. Therefore, testing on a blood sample could be completed with only 10-15 planar supports. Conversely, in known cytocentrifugation methods, the number of cells per planar support is so low that it makes it impossible to manage and analyse the patient's liquid biopsy sample.

Moreover, the marker staining of a lower number of biological samples makes an automated management possible, associated to a decreased reagent volume consumption, which results in important cost savings.

According to an embodiment of the present invention, the method for immobilising live cells within biological samples for analytical and diagnostic purposes also comprises a step of associating a confining hydrophobic substance to the planar support. A confining hydrophobic substance is any substance comprising a hydrophobic compound or functional group that due to its structure shows no affinity for water.

Numerous experiments conducted by the Applicant have shown that the confining hydrophobic substance is preferably alcohol-based and conveniently dissolved in a volatile solvent.

Disposition of the confining hydrophobic substance on the planar support defines one or more containment boundaries that prevent an aqueous liquid to go through. The containment boundaries can define one or more surface areas that are variable in shape and size and to which a laminar layer of the biological sample can be confined without any other physical containment boundary element.

After applying the confining hydrophobic substance, the planar support is dried so that the volatile solvent dissolves. Hence, the containment boundary, when dry, forms a molecular layer that is substantially flush with the surface of the planar support.

In this way, it is possible to deposit on the planar support several laminar layers that can be of the same biological sample or each of a different biological sample, keeping them separate from one another. In addition, it is possible to create surface areas of different sizes and having a different volume of biological liquid contained in them. This solution is particularly effective in cases where the planar support has to be handled with a standard automated liquid handling platform.

The step of associating a confining hydrophobic substance to the planar support preferably takes place after the step of providing the planar support and before the step of depositing a laminar layer of biological sample on the planar support.

A further surprising effect that the tests conducted by the Applicant have shown is that the method for immobilising live cells within biological samples for analytical and diagnostic purposes of the present invention allows only live cells to adhere to the flat nano-structured surface of the planar support.

All details can be replaced by other technically equivalent elements. Likewise, the materials used, as well as the contingent shapes and dimensions, can be any, according to requirements, without departing from the scope of protection in the following claims.

The invention claimed is:

1. A method for immobilizing live cells within biological samples for analytical and diagnostic purposes comprising the steps of:
    providing a biological sample containing a predetermined number of cells to analyze;
    providing a planar support suitable for use in an analytical device, said planar support comprising a surface that is flat and functionalized with a surface coating in the form of a film comprising a nanostructured material;
    depositing a laminar layer of said biological sample on said functionalized surface of said planar support in order to cause the cells contained in the biological sample to adhere to the functionalized surface of the planar support;
    adhering the cells contained in the biological sample to the functionalized surface of the planar support;
    positioning a fixative on the laminar layer of the biological sample, wherein
    all steps of the method being performed at a temperature between 18° and 25° C., and
    the nanostructured material is selected from the group consisting of Zirconium Dioxide ($ZrO_2$) and Titanium Dioxide ($TiO_2$).

2. The method according to claim 1 wherein the ratio between the total surface area of the planar support and the surface area of the planar support occupied by the laminar layer of biological sample is between 3:2 and 9:1.

3. The method according to claim 2, wherein the volume of the laminar layer of said biological sample is between 1 microliter and 2 milliliters.

4. The method according to claim 1, further comprising a step of associating a confining hydrophobic substance to the planar support before the depositing a laminar layer of biological sample on the planar support.

5. The method according to claim 1, wherein the live cells that remain attached to the surface coating of the planar support are Circulating Tumor Cells (CTC) or Circulating Fetal Cells (CFC).

6. A method of diagnosis or prognosis of a tumor in a patient, comprising the steps of performing the method according to claim 1, analyzing the biological sample to identify Circulating Tumor Cells (CTCs), enumerating the CTCs through image analysis to obtain first clinical data on the patient.

7. The method according to claim 1, wherein the time range between the positioning the laminar layer of biological sample on the planar support and the positioning the fixative on said laminar layer is less than 4 minutes.

8. The method according to claim 1, wherein the film comprising the nanostructured material has thickness between 20 nM and 200 nM.

9. The method according to claim 8, wherein the film comprising the nanostructured material has a surface roughness between 2 nM and 30 nM.

10. The method according to claim 1, wherein a percentage of live cells contained in the biological sample that remain attached to the functionalized surface coating of the planar support is greater than 90%.

* * * * *